US007898464B1

(12) United States Patent
Anderson et al.

(10) Patent No.: US 7,898,464 B1
(45) Date of Patent: Mar. 1, 2011

(54) SYSTEM AND METHOD FOR TRANSMITTING SIGNALS VIA PHOTONIC EXCITATION OF A TRANSMITTER ARRAY

(75) Inventors: William W. Anderson, Half Moon Bay, CA (US); William S. Barquist, Lakeport, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 909 days.

(21) Appl. No.: 11/723,233

(22) Filed: Mar. 19, 2007

Related U.S. Application Data

(60) Provisional application No. 60/790,820, filed on Apr. 11, 2006.

(51) Int. Cl.
*G01S 7/02* (2006.01)
*H01Q 3/30* (2006.01)
*G01S 7/00* (2006.01)
*H01Q 3/00* (2006.01)

(52) U.S. Cl. ................. 342/54; 342/52; 342/73; 342/74; 342/81; 342/82; 342/175; 342/368; 342/376

(58) Field of Classification Search .............. 342/52-54, 342/73-103, 175, 368-377, 367, 195; 385/15, 385/31, 33-35; 359/237, 238, 240, 245, 359/279, 298, 315, 316
See application file for complete search history.

(56) References Cited

U.S. PATENT DOCUMENTS 3,878,520 A * 4/1975 Wright et al. ................. 342/368
3,944,330 A 3/1976 Tsunoda et al.
4,028,702 A * 6/1977 Levine .......................... 342/374
4,258,363 A * 3/1981 Bodmer et al. ............... 342/368
4,379,296 A 4/1983 Farrar et al.
4,725,844 A * 2/1988 Goodwin et al. ............. 342/374
4,736,463 A * 4/1988 Chavez ......................... 342/367
4,739,334 A * 4/1988 Soref ............................ 342/368
4,885,589 A * 12/1989 Edward et al. ............... 342/175
4,929,956 A * 5/1990 Lee et al. ..................... 342/376
4,965,603 A * 10/1990 Hong et al. ................... 342/372
5,051,754 A * 9/1991 Newberg ....................... 342/375
5,117,239 A * 5/1992 Riza ............................. 342/375
5,191,339 A * 3/1993 Riza ............................. 342/372

(Continued)

OTHER PUBLICATIONS

Aretz, K. et al., Reduction of Crosstalk and Losses of Intersecting Waveguide, Electronics Letters, May 25, 1989, 730-731, vol. 25, No. 11.

(Continued)

*Primary Examiner* — Bernarr E Gregory
(74) *Attorney, Agent, or Firm* — McDermott Will & Emery LLP

(57) ABSTRACT

A radio frequency (RF) phased array transmitter system comprises a phased array for generating an RF signal. The phased array comprises conductive patches formed in an array, separation gaps, and active sources. Each of the separation gaps is formed between two adjacent ones of the conductive patches, and each of the active sources is formed across its associated one of the separation gaps. The system further comprises an optical source for generating an optical signal and an RF source for generating an RF signal. In addition, the system comprises an optical modulator coupled to the optical source and the RF source. The optical modulator receives an optical signal and an RF signal, and produces an RF modulated optical signal based on the received optical signal and the received RF signal.

26 Claims, 9 Drawing Sheets

U.S. PATENT DOCUMENTS

| | | | | |
|---|---|---|---|---|
| 5,274,381 | A * | 12/1993 | Riza | 342/368 |
| 5,274,385 | A * | 12/1993 | Riza | 342/375 |
| 5,278,924 | A | 1/1994 | Schaffner | |
| 5,285,308 | A | 2/1994 | Jenkins et al. | |
| 5,305,009 | A * | 4/1994 | Goutzoulis et al. | 342/372 |
| 5,307,073 | A * | 4/1994 | Riza | 342/372 |
| 5,311,196 | A * | 5/1994 | Hanson et al. | 342/368 |
| 5,347,601 | A | 9/1994 | Ade et al. | |
| 5,353,033 | A * | 10/1994 | Newberg et al. | 342/375 |
| 5,359,447 | A | 10/1994 | Hahn et al. | |
| 5,359,449 | A | 10/1994 | Nishimoto et al. | |
| 5,363,230 | A | 11/1994 | Djupsjobacka | |
| 5,365,239 | A * | 11/1994 | Stilwell, Jr. | 342/368 |
| 5,374,935 | A * | 12/1994 | Forrest | 342/368 |
| 5,488,677 | A | 1/1996 | Tokano | |
| 5,512,907 | A * | 4/1996 | Riza | 342/375 |
| 5,543,805 | A * | 8/1996 | Thaniyavarn | 342/368 |
| 5,568,574 | A | 10/1996 | Tanguay, Jr. et al. | |
| 5,613,020 | A | 3/1997 | Uchida et al. | |
| 5,615,037 | A | 3/1997 | Betts et al. | |
| 5,638,468 | A | 6/1997 | Tokano et al. | |
| 5,694,498 | A * | 12/1997 | Manasson et al. | 342/368 |
| 5,731,790 | A * | 3/1998 | Riza | 342/368 |
| 5,799,116 | A | 8/1998 | Yamamoto | |
| 5,862,276 | A | 1/1999 | Karras | |
| 5,886,807 | A | 3/1999 | Cummings | |
| 5,999,128 | A * | 12/1999 | Stephens et al. | 342/375 |
| 6,124,827 | A * | 9/2000 | Green et al. | 342/375 |
| 6,137,442 | A * | 10/2000 | Roman et al. | 342/375 |
| 6,208,293 | B1 * | 3/2001 | Adams et al. | 342/368 |
| 6,233,085 | B1 * | 5/2001 | Johnson | 359/279 |
| 6,252,557 | B1 | 6/2001 | Plugge et al. | |
| 6,415,083 | B1 | 7/2002 | Anderson et al. | |
| 6,426,721 | B1 * | 7/2002 | Obara | 342/375 |
| 6,452,546 | B1 * | 9/2002 | Stephens | 342/368 |
| 6,469,822 | B1 * | 10/2002 | Zhu | 359/316 |
| 6,518,923 | B2 | 2/2003 | Barquist et al. | |
| 6,535,165 | B2 * | 3/2003 | Stephens | 342/375 |
| 6,574,021 | B1 * | 6/2003 | Green et al. | 342/371 |
| 6,597,836 | B2 * | 7/2003 | Johnson et al. | 385/33 |
| 6,661,377 | B2 * | 12/2003 | Lee et al. | 342/375 |
| 6,703,596 | B1 | 3/2004 | Moran | |
| 6,768,458 | B1 * | 7/2004 | Green et al. | 342/375 |
| 6,844,848 | B2 * | 1/2005 | Stephens | 342/368 |
| 6,947,621 | B2 | 9/2005 | Bell, Jr. et al. | |
| 7,062,115 | B1 | 6/2006 | Anderson et al. | |
| 7,382,983 | B2 * | 6/2008 | Mizuma et al. | 342/368 |
| 2002/0153906 | A1 | 10/2002 | Girton et al. | |
| 2003/0001791 | A1 | 1/2003 | Barquist et al. | |
| 2003/0193705 | A1 | 10/2003 | Anderson et al. | |

OTHER PUBLICATIONS

Bukkems, H, G, et al., Minimization of the Loss of Intersecting Waveguides in InP-Based Photonic Integrated Circuites, IEEE Photonics Technology Letter, Nov. 1999, 1420-1422, vol. 11, No. 11.

Choi, Y. K. et al., Measurement of low frequency electric field using Ti : $LiNbO_3$, IEEE Proceedings, Apr. 1993, 7-10, vol. 140, No. 2.

Daly, Michael G. et al., Crosstalk Reduction in Intersecting Rib Waveguides, Journal of Lightwave Technology, Jul. 1996, 1695-1698, vol. 14, No. 7.

Girton, D. G. et al., Electrooptic Polymer Mach-Zehnder Modulators, Polymers for Second-Order Nonlinear Optics, ACS Symposium Series 601, Aug. 21-25, 1994, 456-468, Chapter 33.

Harvey, Andrew R. et al., Optical up-conversoin for passive millimetre-wave imaging, SPIE, 1997, 98-109, vol. 3064.

Himeno, A. et al., Single-Mode High-Silica Optical Reflection Bending and Intersecting Waveguides, Electronics Letters, Oct. 24, 1985, 1020-1021, vol. 21, No. 22.

Young, Peter, Electro-Optic E-Field Sensors for Shielding Measurements up to 18GHz, IEEE, 1995, pp. 87-91.

Yu, P. K. L. et al., High Power Photodiode for Antenna Applications, Apr. 15, 2005, IEEE Workshop on Microelectronics and Electron Devices, pp. 4-7.

* cited by examiner

APPROVED: /B.G./

APPROVED: /B.G./

APPROVED: /B.G./

APPROVED: /B.G./

SYSTEM AND METHOD FOR TRANSMITTING SIGNALS VIA PHOTONIC EXCITATION OF A TRANSMITTER ARRAY

CROSS-REFERENCES TO RELATED APPLICATIONS

The present application claims the benefit of priority under 35 U.S.C. §119 from U.S. Provisional Patent Application Ser. No. 60/790,820, entitled "Transmitting Signals via Photonic Excitation of an Active Sampler Array," filed on Apr. 11, 2006, which is hereby incorporated by reference in its entirety for all purposes.

FIELD OF THE INVENTION

The present invention generally relates to transmitters and, in particular, relates to systems and methods for transmitting signals via photonic excitation of a transmitter array.

BACKGROUND OF THE INVENTION

Phased array antennas, both transmit and receive, typically consist of closely spaced individual antenna elements. The close spacing of these elements introduces cross coupling effects which dominate antenna performance characteristics. In addition, the antenna elements are designed for maximum power conversion efficiency between a radiation mode and a transmission line or circuit mode at the operating frequency of the antenna. This latter requirement consists of conjugate impedance matching of the impedance presented by the antenna terminal or port to the source impedance of a transmitter or the load impedance of a receiver.

The performance issues facing active phased array transmitters are radio frequency (RF) bandwidth, true time delay steering for wide bandwidth, electromagnetic interference (EMI) and beam steering control. Realizable active array transmitters providing this performance are limited in weight, size and generally costly.

SUMMARY OF THE INVENTION

According to one embodiment of the present invention, a radio frequency (RF) phased array transmitter system for radar, communication and/or electronic warfare provides the following features: broadband (multi octave), thin and conformal, optically addressed, optically beam controlled, and multi beam. An array of closely spaced conductive pattern elements is fabricated according to one embodiment such that the impedance at the gaps between the conductive areas is, to first order, real and frequency independent. The gaps are supplied by a photogenerated RF current from an optical modulator. The RF power radiated from a single gap is proportional to the square of the RF component of the photocurrent supplied to the gap by the relation $P_{RF}=I(\text{photocurrent})^2\times 377/2$.

According to one embodiment of the present invention, a radio frequency (RF) phased array transmitter system comprises a phased array for generating an RF signal. The phased array includes a plurality of conductive patches formed in an array, a plurality of separation gaps, and a plurality of active sources. Each of the plurality of separation gaps is formed between two adjacent ones of the plurality of conductive patches, and each of the plurality of active sources is formed across its associated one of the plurality of separation gaps. The RF phased array transmitter system further comprises an optical source having an optical output. The optical source is for generating an optical signal. The transmitter system also comprises an RF source having an RF output. The RF source is for generating an RF signal. In addition, the transmitter system comprises an optical modulator coupled to the optical source and the RF source. The optical modulator has a first modulator input, a second modulator input and a modulator output. The first modulator input is for receiving an optical signal, the second modulator input is for receiving an RF signal, and the modulator output is for providing an RF modulated optical signal based on the received optical signal and the received RF signal.

According to one embodiment of the present invention, a radio frequency (RF) transmitter system comprises a plurality of pattern elements comprising conductive areas, a plurality of separation gaps, and a plurality of active sources. Each of the plurality of separation gaps is formed between each set of adjacent ones of the plurality of pattern elements. Each of the plurality of active sources is formed across its associated one of the plurality of separation gaps. Each of the plurality of active sources is for receiving electrical power, each of the plurality of active sources is for receiving an optical signal, and the plurality of active sources is for generating RF current.

According to one aspect of the present invention, a method is provided for transmitting a radio frequency (RF) signal via photonic excitation of a transmitter. The method comprises the steps of: receiving an optical signal; receiving an RF signal; modulating the optical signal using the RF signal by an optical modulator; receiving electrical power by a plurality of active sources of a transmitter; receiving a modulated optical signal by the plurality of active sources of the transmitter; generating RF current by the plurality of active sources; and radiating RF power.

Additional features and advantages of the invention will be set forth in the description below, and in part will be apparent from the description, or may be learned by practice of the invention. The objectives and other advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide further understanding of the invention and are incorporated in and constitute a part of this specification, illustrate embodiments of the invention and together with the description serve to explain the principles of the invention.

DETAILED DESCRIPTION OF THE INVENTION

In the following detailed description, numerous specific details are set forth to provide a full understanding of the present invention. It will be obvious, however, to one ordinarily skilled in the art that the present invention may be practiced without some of these specific details. In other instances, well-known structures and techniques have not been shown in detail not to obscure the present invention.

One approach to exciting phased array antennas is to use an electronic radio frequency ("RF") generator. Either a single electronic RF generator is remotely located such that the RF signals are distributed to the elements of the phased array, or individual electronic RF generators are located at the individual element or sub-array sites.

Drawbacks to using electronic RF generators to excite phased array antennas include the large amount of circuitry required, the loss of RF power in transmission lines between RF sources and the antenna elements, and the difficulty of making the required structure conformal to non-planar surfaces.

According to one embodiment of the present invention, a wideband radio frequency (RF) phased array transmitter includes an array of isolated metallic patches interconnected by photocurrent generators. The isolated metallic patches are preferably squares or rectangles separated by narrow gaps. The invention, however, is not limited to square or rectangular patches. When all gaps are excited by coherently phased currents, the transmitted beam angle and polarization are prescribed by the inter-gap current generator phases. By alternating the phase of excitation of adjacent gaps in a linear array or a checker-board 2-dimensional array, all photodiode current generators may be interconnected to a single power/bias source. Use of a balanced output Mach Zehnder optical modulator (MZM) may be used to provide the alternating phase of excitation of adjacent gaps from a single RF voltage source. By over-driving a MZM, efficient harmonic generation/transmission is obtained at the photocurrent generators. Because the structure uses thin conducting patches on an insulating support, photodiodes bridge the gaps between patches, and inductors connect the patches to a power/bias source, the array is inherently low mass and may be made conformal to the surface of various objects such as the curvature of a fuselage, airplane, satellite or vehicle. Excitation of the individual photocurrent generators is preferably by a fiber optic connection between individual photodiodes and an RF modulated optical source through optical power dividers and/or selected optical delay lines.

Figure 1:
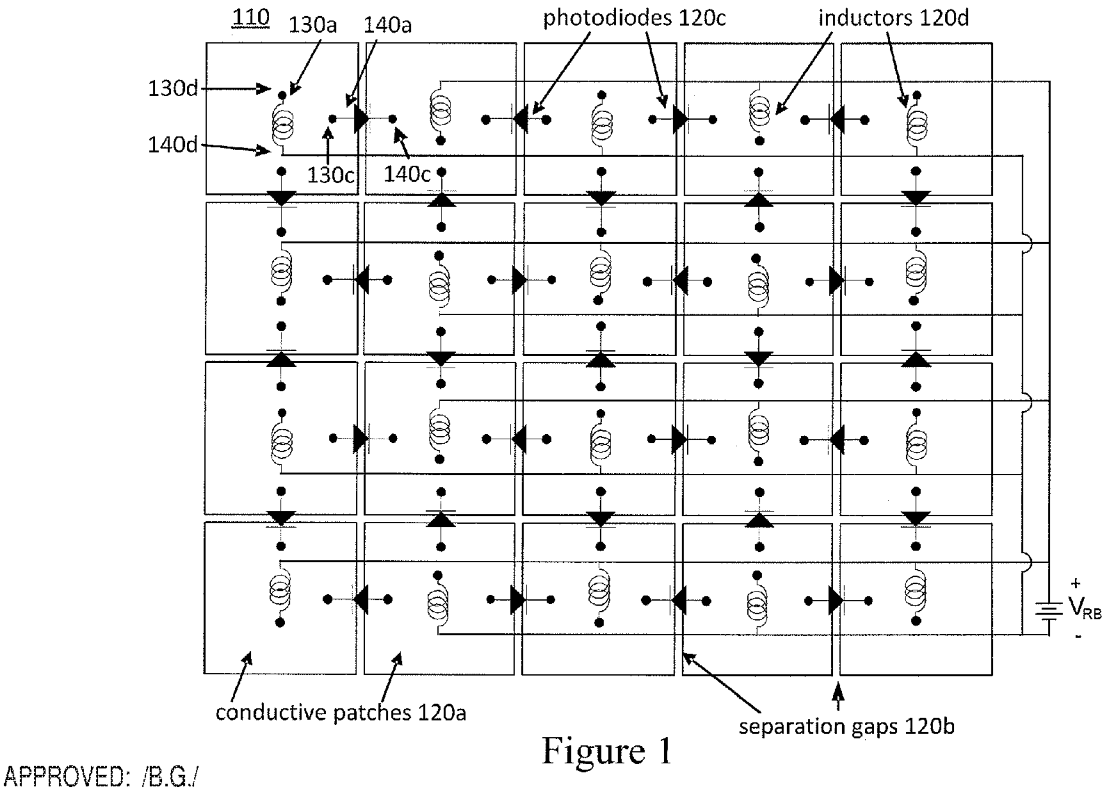
FIG. 1 illustrates a phased array transmitter in accordance with one embodiment of the present invention.

FIG. 1 illustrates a phased array transmitter in accordance with one embodiment of the present invention. A phased array transmitter 110 includes a plurality of pattern elements such as an N×M array of isolated conductive patches 120*a*. N can be any natural number (e.g., 1, 2, 3, 4, . . . 50, . . . 100, . . . etc.), and M can be any natural number (e.g., 1, 2, 3, 4, . . . 50, . . . 100, . . . etc.). N and M can be the same or different numbers. Each of the plurality of pattern elements includes a conductive area that covers the entire surface of the pattern element, as shown in FIG. 1. In an alternative embodiment, a pattern element may include a conductive area that occupies only a portion of the surface of the pattern element. The conductive material may be on an insulating support. In an alternate embodiment, the conductive material may occupy the entire thickness of the pattern element. A conductive area can be formed of a metal (e.g., copper) or other types of conductive materials.

The phased array transmitter 110 further includes separation gaps 120*b*. Each gap is formed between its associated ones of the plurality of pattern elements so that adjacent pattern elements have a gap. Each gap is a fixed gap according to one embodiment. The phased array transmitter 110 also includes active sources such as current generators. According to one embodiment, current generators are an array of photodiodes 120*c* across the gaps 120*b*. Each of the active sources interconnects its associated ones of the plurality of pattern elements. According to one embodiment, reverse biased PN or PIN photodiodes are utilized as active sources of gap current generators between adjacent pattern elements. According to one embodiment, the present invention may utilize hundreds of discrete photodiodes, but the invention is not limited to these. Photodiodes are sometimes referred to as photodetectors. The transmitter 110 further includes an array of inductors 120*d*. According to one embodiment, the inductors are conical copper-wired inductors and can be less than 1 inch in size. The phased array transmitter 110 is thin (e.g., about ¼ inch or less) according to one embodiment.

According to one embodiment, each pattern element has at least a first connection (e.g., 130*a*) to an inductor and a second connection (e.g., 140*a*) to a photodiode, if the pattern elements form a linear array. If the pattern elements form a 2-dimensional array as shown in FIG. 1, then the pattern elements may have three, four or five connections. An inductor has a first end (e.g., 130*d*) and a second end (e.g., 140*d*), and an active source has a first end (e.g., 130*c*) and a second end (e.g., 140*c*). One end (e.g., 130*d*) of each of the inductors is coupled to the first connection (e.g., 130*a*) of the associated one of the plurality of pattern elements. One end (e.g., 130*c*) of each of the active sources is coupled to the second connection (e.g., 140*a*) of the associated one of the plurality of pattern elements. The second end (e.g., 140*d*) of each of the inductors is coupled to a bias voltage source, $V_{RB}$. The second end (e.g., 140*c*) of each of the active sources is coupled to the associated one of the plurality of pattern elements. The two ends of an active source are coupled to adjacent pattern elements. Adjacent active sources are reversed in polarity.

Figure 2:
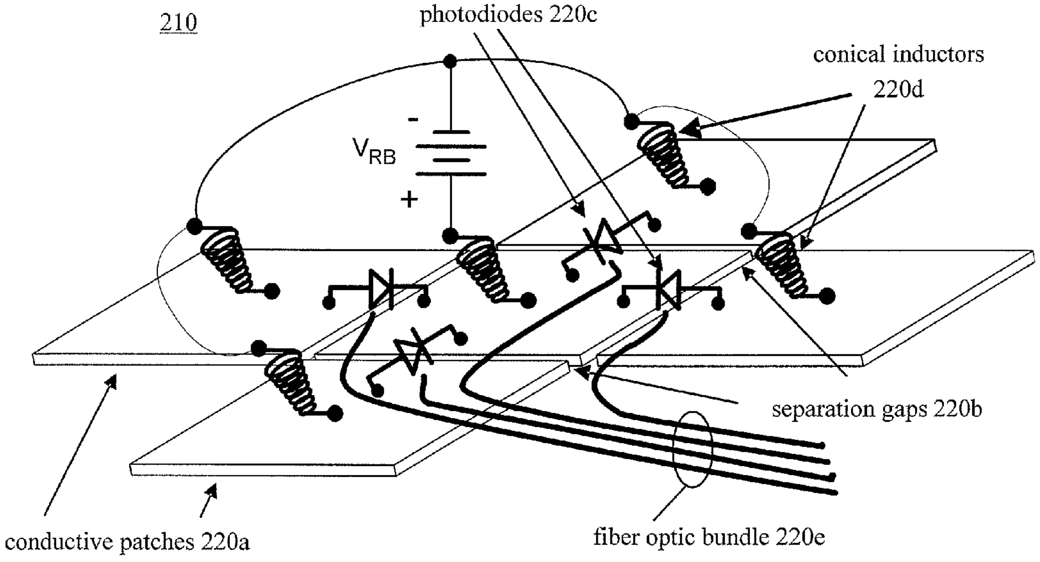
FIG. 2 illustrates a segment of the phased array transmitter in FIG. 1 in a 3-D view in accordance with one embodiment of the present invention.

FIG. 2 illustrates a segment of a phased array transmitter as shown in FIG. 1 in a 3-D view according to one embodiment of the present invention. A phased array transmitter 210 includes conductive patches 220*a*, separation gaps 220*b* between adjacent conductive patches, photodiodes 220*c* bridging the gaps between the adjacent patches, and conical inductors 220*d* having one end attached to a conductive patch and the other end attached to the voltage source, $V_{RB}$. Optical signals (e.g., optical power) are supplied to the photodiodes 220*c* via fiber optic bundles 220*e*.

Figure 3:
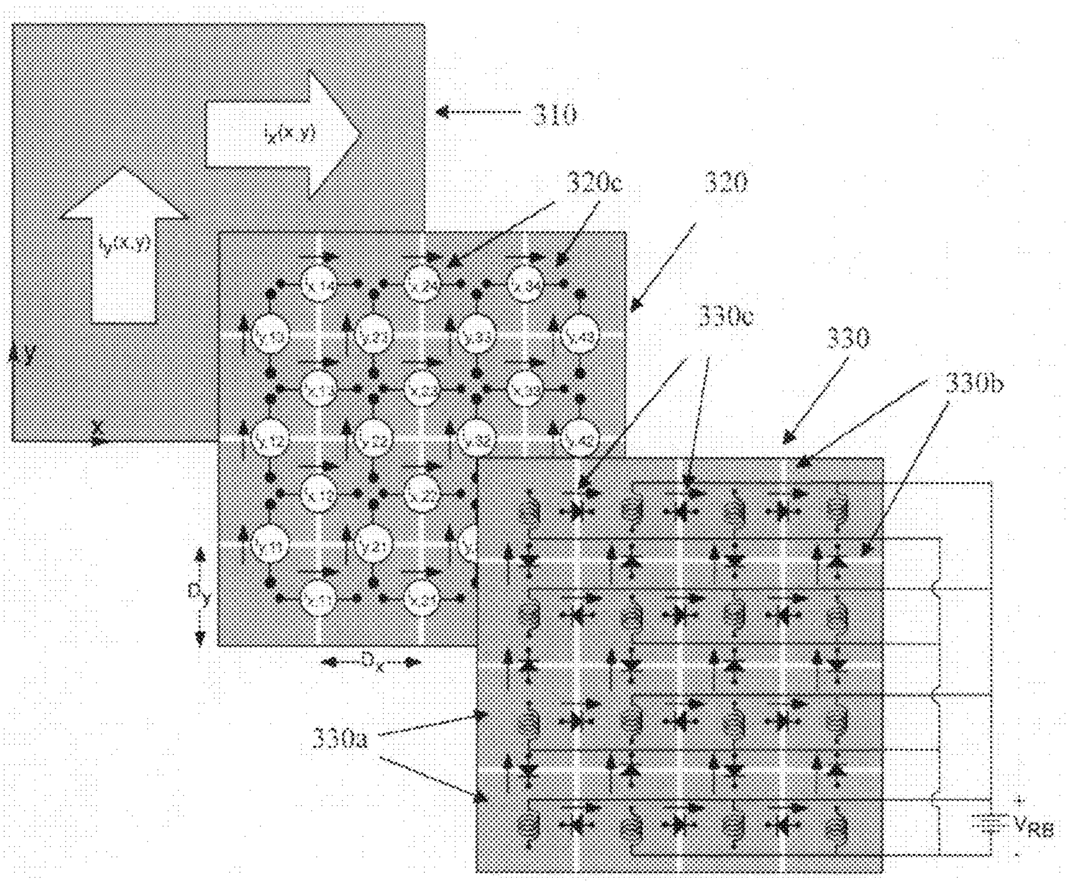
FIG. 3 illustrates a current sheet distribution and its realization as a transmitter in accordance with one embodiment of the present invention.

FIG. 3 illustrates a current sheet distribution and a transmitter according to one embodiment of the present invention. A drawing 310 illustrates a current sheet distribution over a plane, and the present invention utilizes the concept that a current sheet on a surface may couple energy to or from a free space electromagnetic wave. A drawing 320 illustrates that a current sheet may be approximated by an array of photocurrent generators (e.g., 320*c*) when the size of each individual cell (e.g., each of Dx and Dy) is much less than the shortest wavelength of the RF signals produced by a phased array transmitter (e.g., much less than ¼ or ½ of the shortest wavelength of the RF signals radiated or transmitted by the transmitter). Each of Dx and Dy can be viewed as a distance between the centers of the adjacent conductive patches along the x-axis or y-axis, or a distance between the adjacent active sources along the x-axis or y-axis.

The required current sheet is developed by an array of photocurrent generators (e.g., 330*c*) connected across the gaps (e.g., 330*b*) of an array of rectangular metal patches (e.g., 330*a*), as shown by a drawing 330 in FIG. 3. When the conductive patches are square and all of the gaps are supplied by in-phase current sources, each individual gap presents an impedance of $Z_0/2=188.5\Omega$ to the photocurrent generators. $Z_0$, which is the characteristic impedance of free space, is 377Ω. The division by 2 arises since a signal propagating away from the current sheet is generated on both sides of the sheet. The individual current generators may be phased to generate either an E-plane (TM polarized) wave or an H-plane (TE polarized) wave propagating at an angle, θ, to the plane of the current sheet as indicated in Table 1 below. An arbitrary azimuth angle may be obtained by appropriate combination of $i_x$ and $i_y$ for either an E-plane of H-plane excitation. Circular polarized waves may also be generated by adding an appropriately phased E-plane wave to a corresponding H-plane wave.

TABLE 1

| Current distribution A/m in xy-plane (z = 0 plane) | surface current direction | current phase variation | polarization of emittance | plane of emittance |
|---|---|---|---|---|
| $\hat{a}_x I_{0x}{}^{TM} e^{j(\omega t+\phi 1-kx \sin\theta)}$ | x-directed | along x-direction | E-plane or TM wave | xz- plane |
| $\hat{a}_y I_{0y}{}^{TM} e^{j(\omega t+\phi 4-kx \sin\theta)}$ | y-directed | along y-direction | E-plane or TM wave | yz-plane |
| $\hat{a}_x I_{0x}{}^{TE} e^{j(\omega t+\phi 2-kx \sin\theta)}$ | x-directed | along y-direction | H-plane or TE wave | yz-plane |
| $\hat{a}_y I_{0y}{}^{TE} e^{j(\omega t+\phi 3-kx \sin\theta)}$ | y-directed | along x-direction | H-plane or TE wave | xz- plane |

The photocurrent generators may be high optical power handling (20-40 mW), high frequency (10-50 GHz) photodiodes currently available as discrete elements, according to one embodiment. The present invention provides broadband (multi octave) coverage. For example, the frequencies can be 100 MHz to 20 or 30 GHz, 1 GHz to 4 GHz (2 octaves), or 1 GHz to 8 GHz (3 octaves). These are exemplary, and the invention is not limited to these frequency ranges. The RF modulation of an optical carrier may be generated by a balanced MZM which enables a simple, single source direct current (DC) bias supply for an array of photodiode-connected patches. In addition, the use of overdriven MZMs provides potential power efficiencies of RF power radiated to total electrical and optical power into the photodiodes of 58% for fundamental generation, 48% for second harmonic generation, 43% for third harmonic generation, and 40% for forth harmonic generation.

The required phasing of the photo-excitation signals for the individual photocurrent generators may be accomplished in the photonic domain by any of a number of photonic controlled active array systems. Various photonic controlled beam forming methods are known to those skilled in the art.

Figure 4:
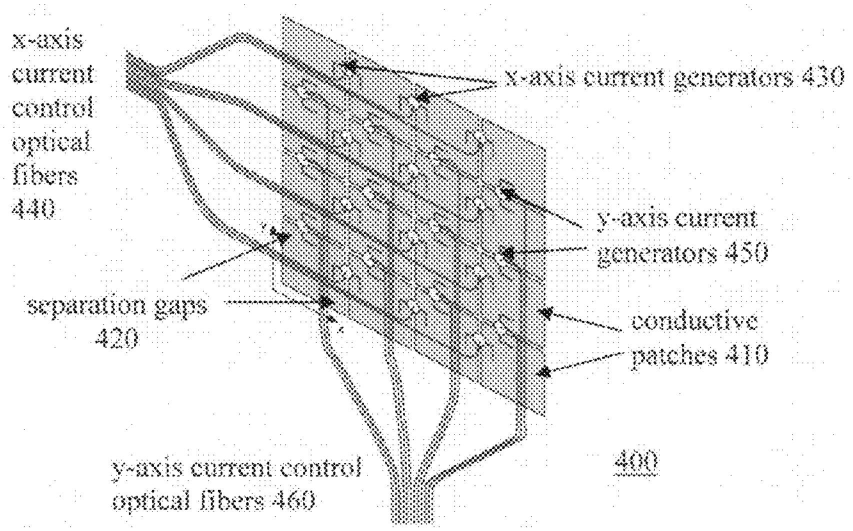
FIG. 4 illustrates a phased array transmitter having multiple current control sources in accordance with one embodiment of the present invention.

FIG. 4 illustrates a phased array transmitter having two control sources in accordance with one embodiment of the present invention. A phased array transmitter 400 includes conductive patches 410 and separation gaps 420. The transmitter 400 further includes x-axis current generators 430 controlled by x-axis current control optical fibers 440, and y-axis current generators 450 controlled by y-axis current control optical fibers 460. While FIG. 4 shows two current control sources, the present invention is not limited to two current control sources, and in an alternate embodiment, it may utilize any number of control sources.

Figure 5:
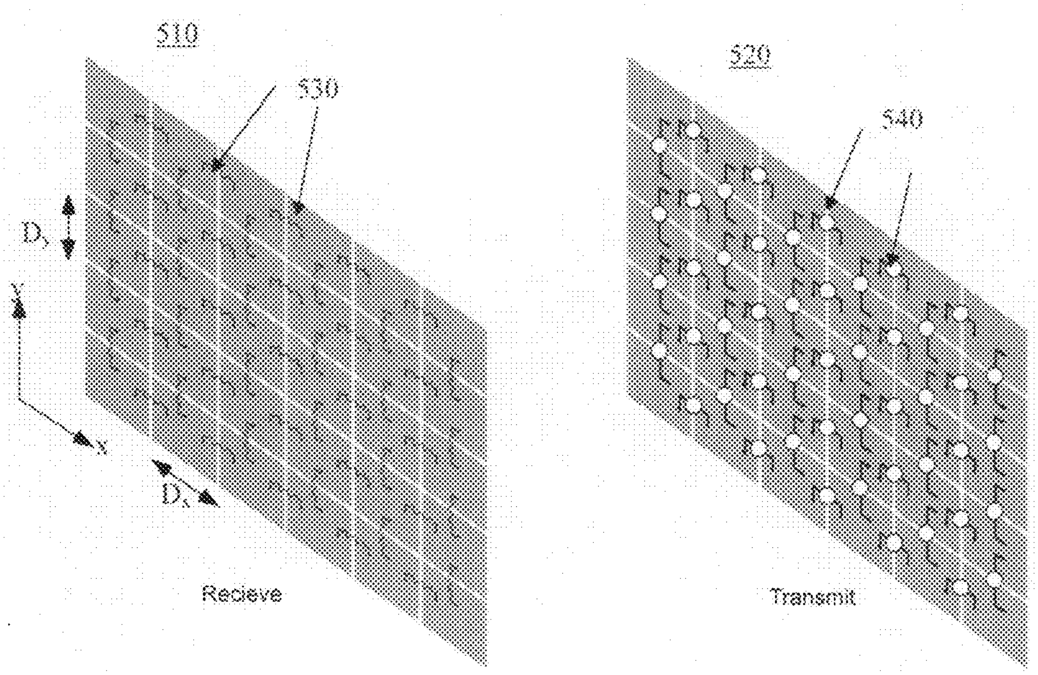
FIG. 5 illustrates a receiver array and a transmitter array in accordance with one embodiment of the present invention.

FIG. 5 illustrates a receiver and a transmitter according to one embodiment. A receiver 510 includes an array of conductive patches capacitively coupled across gaps. The passive gap load impedances (e.g., capacitive impedances 530) include the electro-optically active arms of a Mach Zehnder modulator to sense the voltage induced across the gaps by an incident electro-magnetic field. The receiver configurations are described in U.S. Pat. Nos. 6,252,557 and 7,062,115. A transmitter 520 includes active sources (e.g., 540). Active sources may be current generators such as reverse biased PN or PIN photodiodes. The transmitter 520 also includes conductive pattern elements and gaps.

Figure 6:
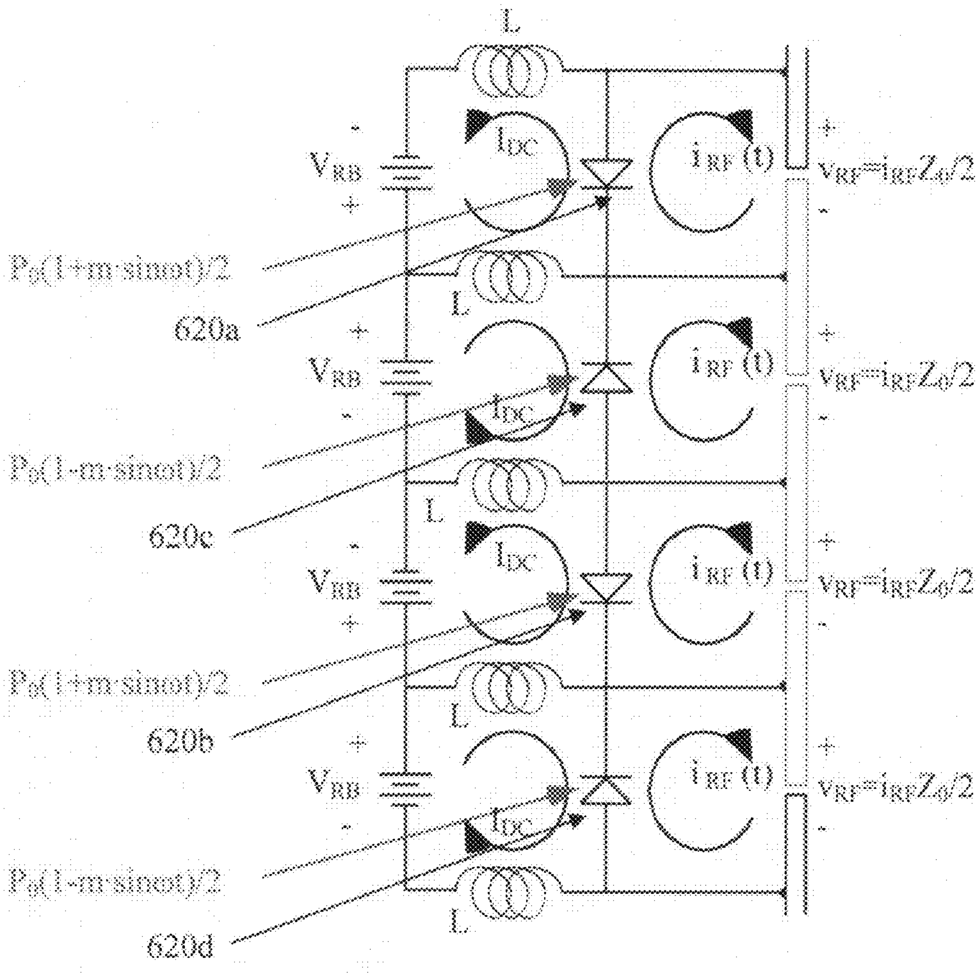
FIG. 6 illustrates circuits for a transmitter array having multiple bias supplies in accordance with one embodiment of the present invention.

A basic circuit concept is illustrated in FIG. 6, according to one embodiment of the present invention. The reverse bias connections ($V_{RB}$) to the photodiodes 620*a*, 620*b*, 620*c* and 620*d* are RF isolated from the circulating RF currents, $i_{RF}$, by inductors, L. The gap impedance (neglecting fringing capacitance across the gaps) is $Z_0/2$ since the gap can radiate both to the front and to the back. The circulating RF currents, $i_{RF}$, produce photovoltages, $v_{RF}$, across the gaps. For each gap, $v_{RF}=i_{RF}Z_0/2$.

Figure 7:
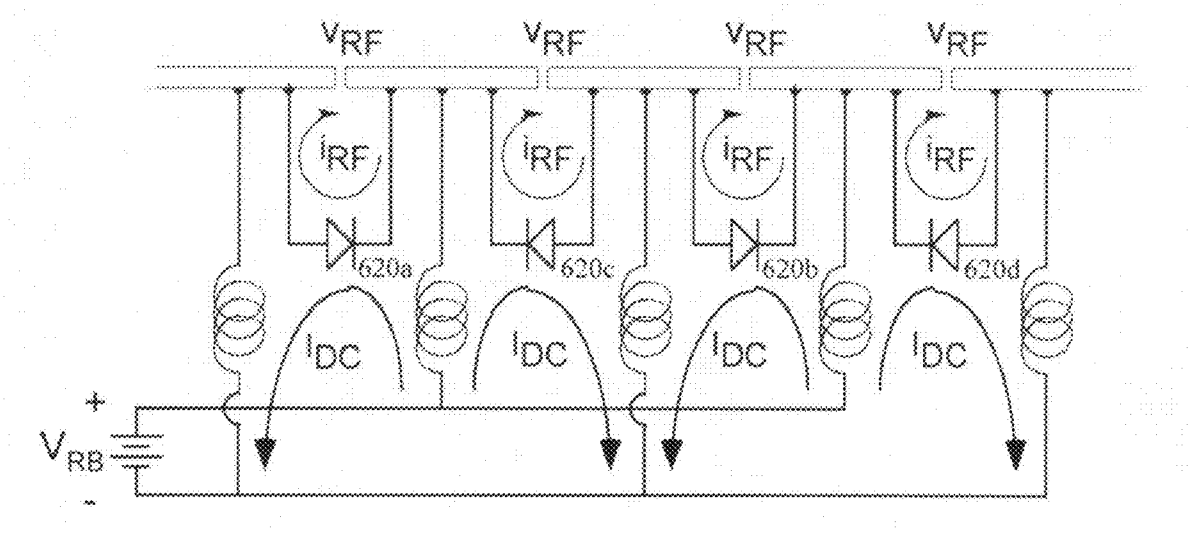
FIG. 7 illustrates circuits for a transmitter array having a single bias supply in accordance with one embodiment of the present invention.

While FIG. 6 shows a linear array with a separate bias supply to each gap (or to each photodiode), the alternating reverse polarity of photodiodes can be accommodated with a single reverse biased DC power supply ($V_{RB}$), as shown in FIG. 7. The alternating polarity photodiodes are addressed by alternating ±sinusoidal photon intensities superimposed on the DC photon intensity so that the RF photovoltages generated across all gaps are in-phase.

Figure 8:
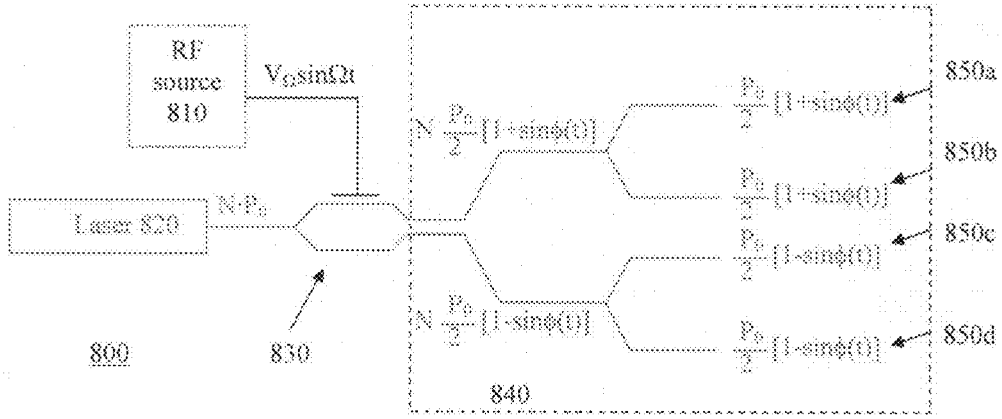
FIG. 8 illustrates a modulated optical source for a phased array transmitter system in accordance with one embodiment of the present invention.

For an N element array of active sources, the two required anti-phase optical signals may be obtained from a single balanced MZM modulator as illustrated in FIG. 8. N can be any number, but in this particular example, N is 4. According to one embodiment of the present invention, a transmitter system 800 in FIG. 8 includes an RF source 810, an optical source such as a laser 820, an optical modulator 830, and an optical power divider 840. The optical modulator 830 receives an optical signal (e.g., optical power) from the laser 820 and an RF voltage signal (e.g., $V_\Omega$ sin Ωt) from the RF source 810 and optically modulates the optical signal at the RF frequency, Ω, of the RF signal. The optical power divider 840 receives the modulated optical signal and divides it into N number of optical signals, each being supplied to its associated active source of a phased array transmitter via an optical fiber. For example, the optical signal 850*a* is supplied to the photodiode 620*a* in FIG. 6, the optical signal 850*b* is supplied to the photodiode 620*b*, the optical signal 850*c* is supplied to the photodiode 620*c*, and the optical signal 850*d* is supplied to the photodiode 620*d*.

Figure 9:
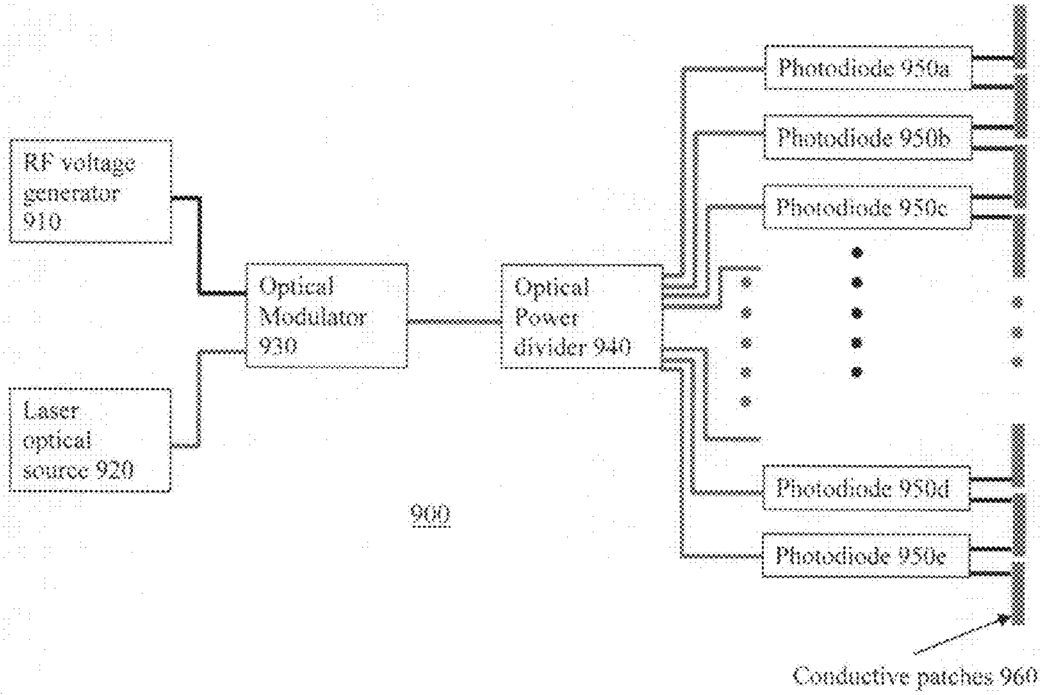
FIG. 9 is an exemplary block diagram of a phased array transmitter system in accordance with one embodiment of the present invention.

FIG. 9 illustrates an exemplary block diagram of a transmitter system according to one embodiment of the present invention. A transmitter system 900 includes an RF source such as an RF voltage generator 910, an optical source such as a laser optical source 920, an optical modulator 930, an optical power divider 940, active sources such photodiodes 950*a*, 950*b*, 950*c*, . . . 950*d*, and 950*e*, conductive patches 960 and separation gaps between the patches. The blocks shown in FIG. 9 provide the functions described in the foregoing paragraphs. While FIG. 9 shows one RF source, one optical source, one optical modulator, and one optical power divider block, in an alternate embodiment, a transmitter system may include multiple RF sources, multiple optical sources, multiple optical modulators and/or multiple optical power dividers.

According to one aspect of the present invention, the phase modulation is given by:

$$\phi(t)=\phi_0+\pi V_\Omega \sin \Omega t/V_\pi \tag{1}$$

where $\phi_0$ is the phase bias (a constant phase which can be any number), $V_\Omega$ is the amplitude of the RF source 810 expressed in voltage, and $V_\pi$ is the sensitivity of the optical modulator 830 expressed as a voltage.

Following Equation (1), the modulated optical signal is given by:

$$\frac{P_0}{2}(1 \pm \sin\phi(t)) = \frac{P_0}{2}\left(1 \pm \sin\left(\phi_0 + \frac{\pi V_\Omega}{V_\pi}\sin\Omega t\right)\right)$$

$$= \frac{P_0}{2}\begin{pmatrix} 1 \pm \sin\phi_0 J_0\left(\frac{\pi V_\Omega}{V_\pi}\right) & \text{dc term} \\ \pm 2\sin\phi_0 \sum_{n=1}^{\infty} J_{2n}\left(\frac{\pi V_\Omega}{V_\pi}\right)\cos(2n\Omega t) & \text{even harmonics} \\ \pm 2\cos\phi_0 \sum_{n=0}^{\infty} J_{2n+1}\left(\frac{\pi V_\Omega}{V_\pi}\right)\cos(\{2n+1\}\Omega t) & \text{odd harmonics} \end{pmatrix}$$

where $P_0$ is a constant optical power indicating how much optical power an optical source such as the laser 820 produces, and $J_0$, $J_{2n}$, and $J_{2n+1}$ are Bessel functions of the first kind. The phase bias, $\phi_0$, will be set either to sin $\phi_0$=±1 (with cos $\phi_0$=0) or to cos $\phi_0$=±1 (with sin $\phi_0$=0).

Note that the dc term for the even harmonics is increased by sin $\phi_0 J_0(\pi V_\Omega/V_\pi)$ for the "+" signed terms and decreased by an equal amount for the "−" signed terms. Therefore, when the phase bias is set at sin $\phi_0$=1 to maximize even harmonic terms, one channel results in a $P_{dc}=A_R P_0[1+J_o(\pi V_\Omega/V_\pi)]V_{RB}/2$, where $A_R$ is the responsivity of a photodiode (expressed in Amps/Watt), and the anti-phase channel results in a $P_{dc}=A_R P_0[1-J_o(\pi V_\Omega/V_\pi)]V_{RB}/2$, but the total dc power supplied by the $V_{RB}$ source for two channels is $P_{dc}=A_R P_0 V_{RB}$. When the phase bias is set at cos $\phi_0$=1 to maximize odd harmonic terms, the dc power supplied by the $V_{RB}$ source for each channel is $P_{dc}=A_R P_0 V_{RB}/2$.

According to one aspect of the present invention, the current flowing in a dc mesh in FIG. 6 is:

$$I_{DC} = \frac{A_R P_0}{2} + I_0\left(1 - e^{-\frac{V_{RB}}{kT}}\right) \approx \frac{A_R P_0}{2} \tag{2}$$

where the approximation is valid as long as the photodiodes remain in reverse bias. The power supplied by the reverse bias source $V_{RB}$ is then simply:

$$P_{DC} \equiv I_{DC} V_{RB} = V_{RB}\frac{A_R P_0}{2} \tag{3}$$

The RF current and voltage at the $p^{th}$ harmonic generated at the gap impedance are:

$$I_{RF} = A_R P_0 J_p\left(\frac{\pi V_\Omega}{V_\pi}\right)\cos(p\Omega t) \tag{4}$$

$$V_{RF} = A_R P_0 J_p\left(\frac{\pi V_\Omega}{V_\pi}\right)\frac{Z_0}{2}\cos(p\Omega t)$$

so that the average radiated power contribution from a single gap in an infinite array is:

$$P_{RF} = (A_R P_0)^2 J_p^2\left(\frac{\pi V_\Omega}{V_\pi}\right)\frac{Z_0}{4} \tag{5}$$

Figure 10:
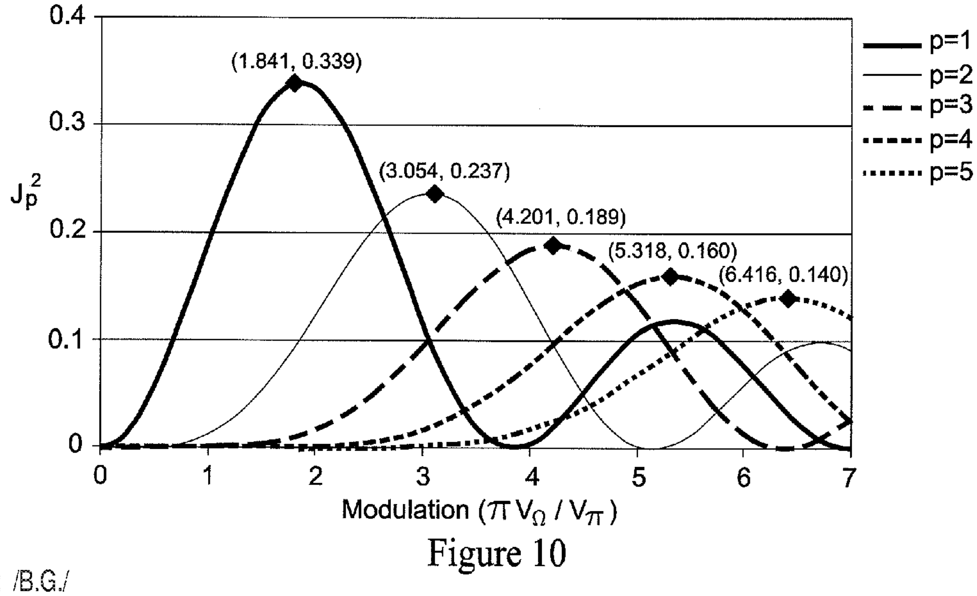
FIG. 10 illustrates that the radiated power at each harmonic is proportional to the Bessel function squared in accordance with one aspect of the present invention.

According to one aspect of the present invention, to the extent that fringing field capacitance at the gap can be neglected compared to $Z_0/2$, the radiated power at each harmonic is proportional to the Bessel function squared as shown in FIG. 10 (assuming sin $\phi_0$ or cos $\phi_0$ set to 0 as appropriate). The maximum values of the Bessel function squares are shown on FIG. 10. By over modulating, the maximum value of the $5^{th}$ harmonic can reach 40% of the maximum power available from the fundamental.

Figure 11:
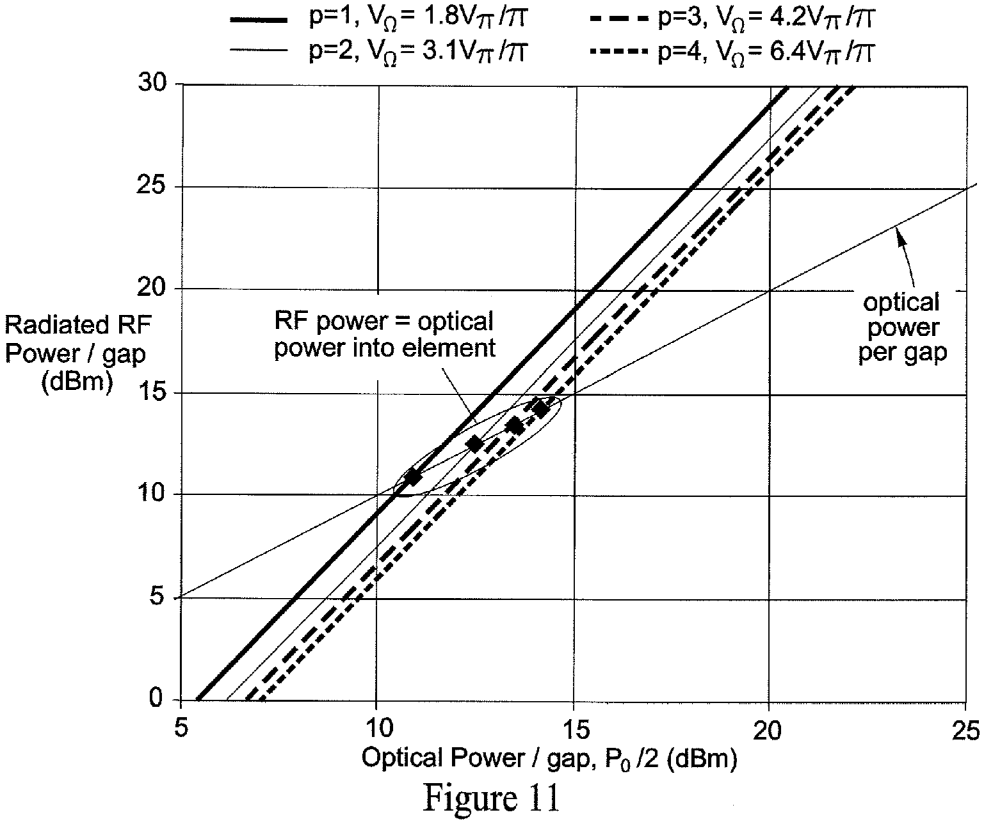
FIG. 11 illustrates the maximum power that could be radiated from a gap at the fundamental and first three overtones according to one aspect of the present invention.

FIG. 11 shows the maximum power that could be radiated from a gap at the fundamental and first three overtones according to one aspect of the present invention. In Equation (5) above, responsivity, $A_R$, is assumed to be 0.8 Amps/Watt, which is a typical value for photonic systems operating at an optical wavelength of 1.55 μm. The optical power per gap in all of the equations is taken to be $P_0/2$ since there is a division of in-phase and anti-phase modulations in the balanced output of the modulator as shown in FIG. 8. Note that as in the case of a receiver, the RF power is a quadratic function of the optical power. In FIG. 11, the diamonds on the RF power curves are the points at which the radiated RF power equals the optical power into the photodiodes.

According to one embodiment, the photodiodes need to be retained in reverse bias. If any one harmonic is to be the desired RF signal, the voltage amplitude is dominated by that term with optimized RF drive of $\pi V_\Omega/V_\pi$. The amplitude of the RF voltage across the gap should not exceed the bias supply reverse bias, $V_{RB}$, which imposes the requirement on $V_{RB}$ of:

$$V_{RB} \geq A_R P_0 J_p\left(\frac{\pi V_\Omega}{V_\pi}\right)\frac{Z_0}{2}. \tag{6}$$

which, in turn, places a lower limit on the bias supply electrical power requirement:

$$P_{DC} \geq (A_R P_0)^2 J_p\left(\frac{\pi V_\Omega}{V_\pi}\right)\frac{Z_0}{4} \tag{7}$$

per gap. The "raw power" supplied to each photodiode is then given by:

$$P_{raw} \equiv P_{DC} + \frac{P_0}{2} \tag{8}$$

and the elemental gap conversion efficiency is:

$$\eta_{gap} \equiv \frac{P_{RF}}{P_{DC} + P_0/2} \leq \frac{J_p\left(\frac{\pi V_\Omega}{V_\pi}\right)}{1 + \frac{2}{P_0 A_R^2 J_p^2\left(\frac{\pi V_\Omega}{V_\pi}\right)Z_0}} \tag{9}$$

Figure 12:
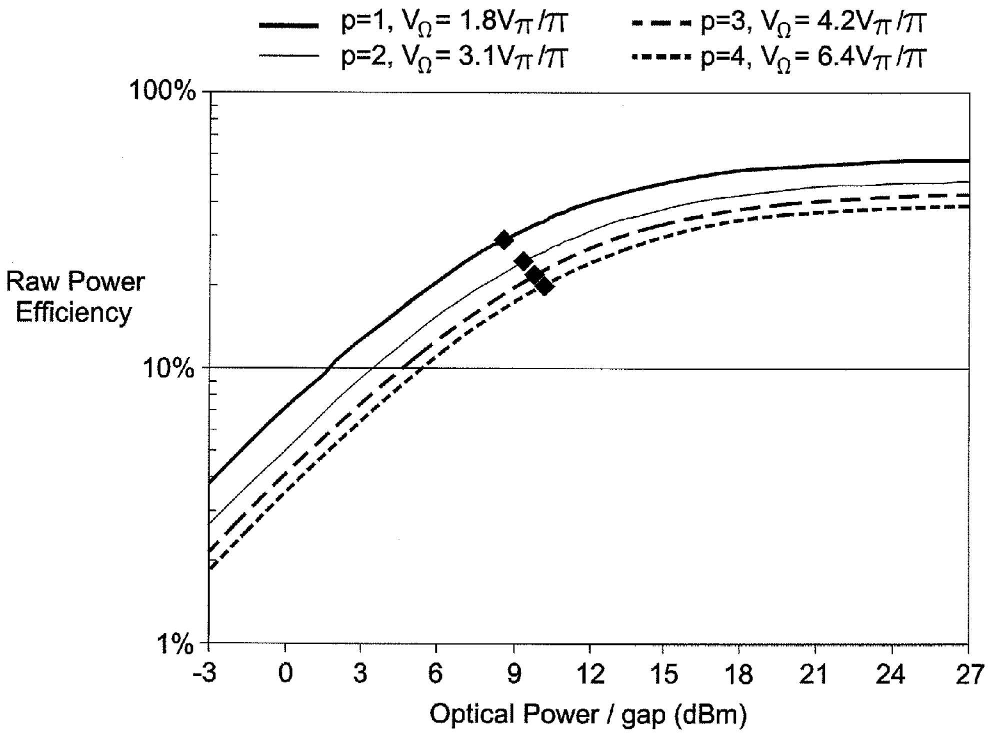
FIG. 12 illustrates graphs of raw power efficiency as a function of optical power per gap in accordance with one aspect of the present invention.

The maximum gap conversion efficiency from Equation (9) is plotted in FIG. 12. The diamond points on the "raw power" efficiency curves are the points at which the bias source electrical power equals the optical power to each gap of the phased array transmitter. Note that the asymptotic value of each efficiency curve is $J_p(x_{max})$ where $x_{max}$ is the argument at which the pth order Bessel function takes on its maximum value.

Figure 13:
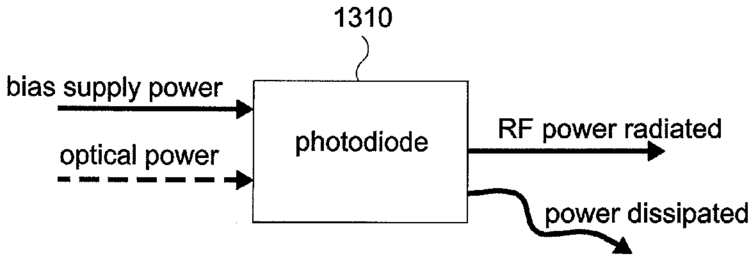
FIG. 13 illustrates the power flows during a transmit mode operation of an active source in a phased array transmitter in accordance with one embodiment of the present invention.

FIG. 13 illustrates the power flows during a transmit mode operation of an active source (e.g., a photodiode) in a phased array transmitter in accordance with one aspect of the present invention. A photodiode 1310 receives bias supply electrical power from a bias source and optical power from an optical source and produces RF power being radiated from the transmitter and power being dissipated in the transmitter.

Figure 14:
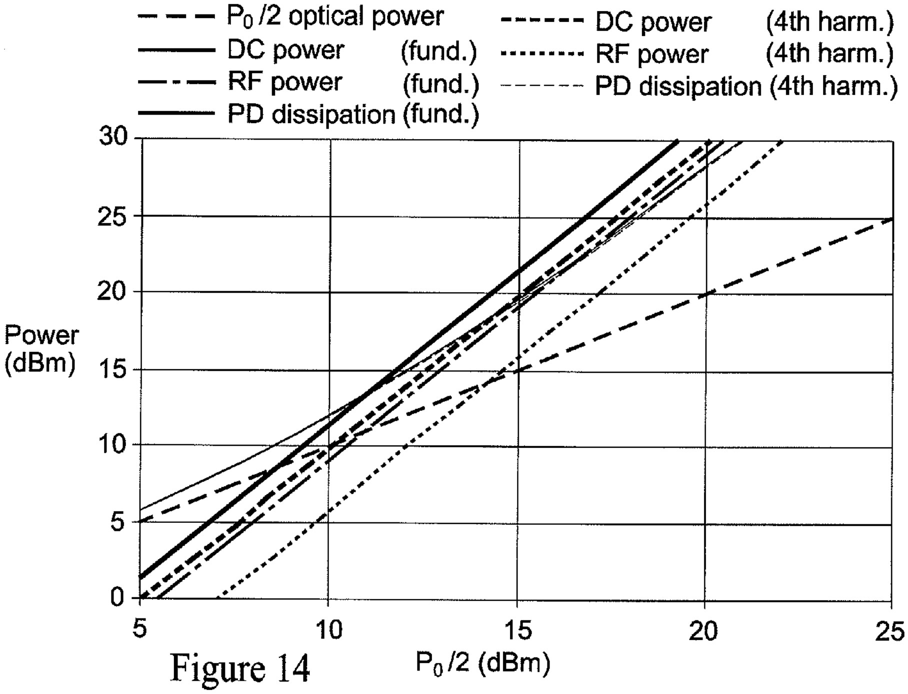
FIG. 14 illustrates various power flows as a function of optical power in accordance with one aspect of the present invention.

FIG. 14 illustrates various power flows as a function of optical power to the photodiode for the two drive cases maximizing either the fundamental or the $4^{th}$ harmonic in accordance with one aspect of the present invention. FIG. 14 shows the operation of a transmit system as the control of RF radiated power by the RF modulated optical signal incident on the photodiode. The powers shown in FIG. 13 and the powers plotted in FIG. 14 are:

$P_0/2$, the controlling optical power into the photodiode, Eqn. (3)

$P_{DC}=I_{DC}V_{RB}=V_{RB}A_R P_0/2$, the DC electrical power with $V_{RB}=A_R P_0 J_p(\pi V_\Omega/V_\pi)Z_0/2$ from the peak value of $V_{RF}$ in Eqn. (4).

Eqn. (5), $P_{RF}=(A_R P_0)^2 J_p^{\,2}(\pi V_\Omega/V_\pi)Z_0/4$, the average radiated RF power $P_{PD}=P_{DC}+P_0/2-P_{RF}$, the power dissipated in the photodiode.

The analyses provided in the foregoing paragraphs only considered the power delivered to or from the photodiode. According to one aspect of the present invention, if the optical power is obtained from a Yb fiber laser, the electro optic (EO) conversion efficiency may be up to 25% so that the electrical power required to generate $P_0/2$ is $2P_0$. In this case, the wall plug electrical efficiency is:

$$\eta_{elect.} \equiv \frac{P_{RF}}{P_{DC} + \frac{P_0/2}{\eta_{EO}}} \leq \frac{A_R^2 J_p^2\left(\frac{\pi V_\Omega}{V_\pi}\right)Z_0\frac{P_0}{2}}{A_R^2 J_p\left(\frac{\pi V_\Omega}{V_\pi}\right)Z_0\frac{P_0}{2} + \frac{1}{\eta_{EO}}}.$$

If the reverse bias voltage is taken as a fixed value, e.g., $V_{RB}$=9 volts, bias source power from Equation (3) becomes simply:

$$P_{DC} = 9\frac{A_R P_0}{2}$$

and the electrical efficiency is given by:

$$\eta_{elect.} \equiv \frac{P_{RF}}{P_{DC} + \frac{P_0/2}{\eta_{EO}}} \leq \frac{A_R^2 J_p^2\left(\frac{\pi V_\Omega}{V_\pi}\right)Z_0\frac{P_0}{2}}{V_{RB}A_R + \frac{1}{\eta_{EO}}}.$$

Figure 15:
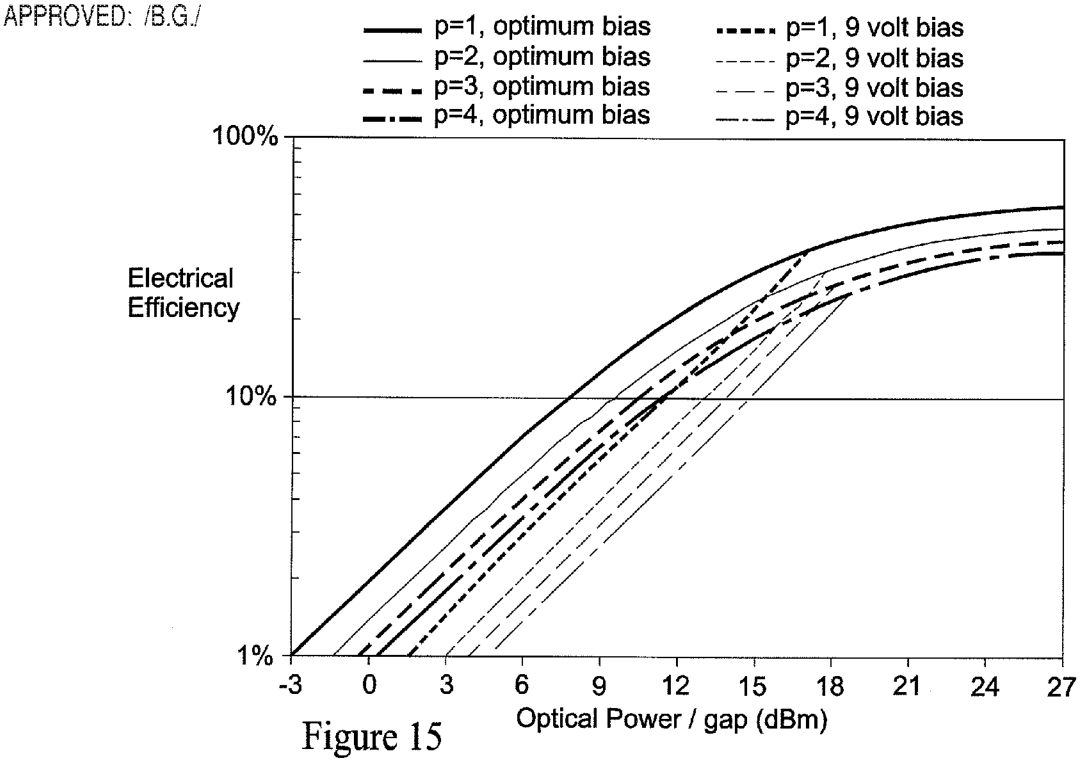
FIG. 15 illustrates various curves for electrical efficiency as a function of optical power per gap in accordance with one aspect of the present invention.

FIG. 15 illustrates various curves for electrical efficiency as a function of optical power per gap when the optimum bias voltage is used (where p=1, 2, 3 or 4) and when the bias voltage is fixed at 9 volts (where p=1, 2, 3 or 4) according to one aspect of the invention.

Figure 16:
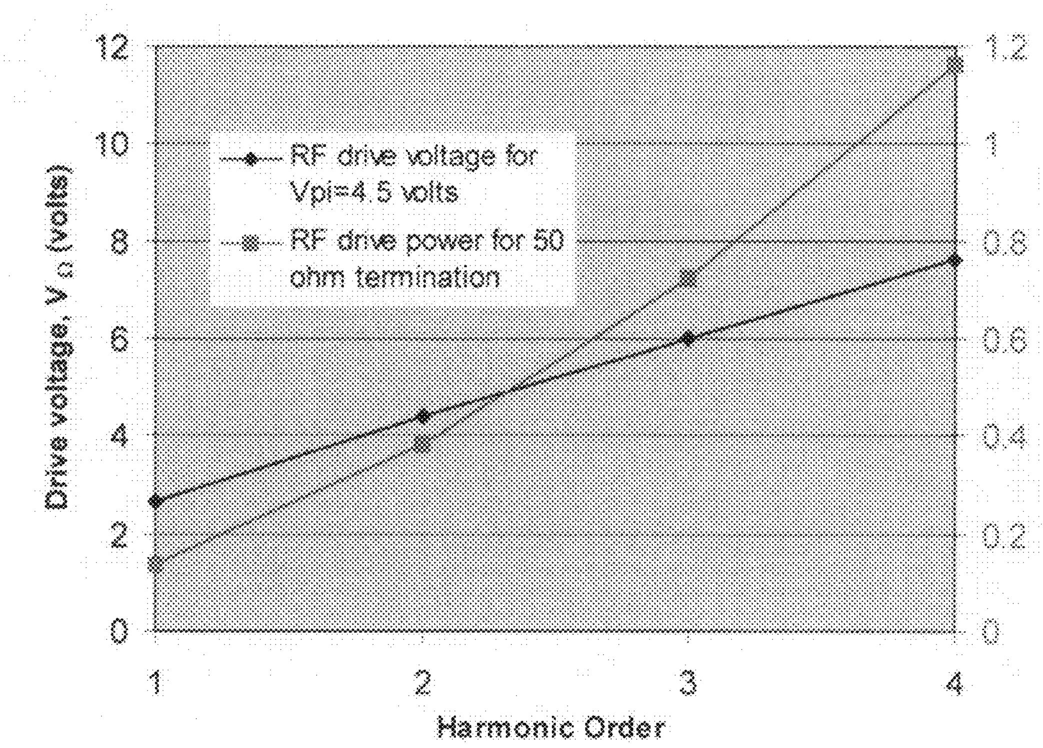
FIG. 16 illustrates the drive voltage and drive power requirements for a typical lithium niobate Mach Zehnder optical modulator in accordance with one embodiment of the present invention.

The RF power required to modulate the optical carrier is not considered in FIGS. 10-15. If the MZM is unterminated, it presents a purely capacitive load to the RF current generator, and no RF power is supplied to the MZM. In FIG. 16, the drive voltage and drive power requirements are shown for a typical lithium niobate MZM in accordance with one aspect of the present invention, assuming a typical RF generator with 50Ω source impedance.

Many benefits accrue to an array of conductive pattern elements according to the present invention. An array of square (or rectangular) conductive pattern elements (e.g., metallic patches) with photodiodes interconnecting the patches has a broadband, purely resistive radiation impedance loading the photodiode current sources. The required structure is easily made conformal to non-planar surfaces. Because the RF signal is already on an optical carrier, various photonic approaches to beam control may be utilized. In addition, because the RF current is photogenerated, rather than provided by an electronic RF generator, there is a minimum of circuitry associated with each element.

According to one embodiment, the present invention does not require a highly integrated structure but rather uses conventional components to construct a versatile emitting array. In particular, the present invention utilizes direct conversion of DC power from a voltage source into a radiated RF power. In addition, the present invention provides methods to provide negligible electronic circuitry immediately behind the antenna terminal or port to minimize the losses associated with metallic connections between antenna terminals or ports and transmit or receive electronics at microwave frequencies and above.

The description of the invention is provided to enable any person skilled in the art to practice the various embodiments described herein. While the present invention has been particularly described with reference to the various figures and embodiments, it should be understood that these are for illustration purposes only and should not be taken as limiting the scope of the invention.

There may be many other ways to implement the invention. Various functions and elements described herein may be partitioned differently from those shown without departing from the sprit and scope of the invention. Various modifications to these embodiments will be readily apparent to those skilled in the art, and generic principles defined herein may be applied to other embodiments. Thus, many changes and modifications may be made to the invention, by one having ordinary skill in the art, without departing from the spirit and scope of the invention.

A reference to an element in the singular is not intended to mean “one and only one” unless specifically stated, but rather “one or more.” The term “some” refers to one or more. All structural and functional equivalents to the elements of the various embodiments described throughout this disclosure that are known or later come to be known to those of ordinary skill in the art are expressly incorporated herein by reference and intended to be encompassed by the invention. Moreover, nothing disclosed herein is intended to be dedicated to the public regardless of whether such disclosure is explicitly recited in the above description.

What is claimed is:

1. A radio frequency (RF) phased array transmitter system comprising:

- a phased array for generating an RF signal, the phased array comprising:
  - a plurality of conductive patches formed in an array such that a plurality of separation gaps are formed, wherein each of the plurality of separation gaps is formed between two adjacent ones of the plurality of conductive patches; and
  - a plurality of active sources, each of the plurality of active sources formed across its associated one of the plurality of separation gaps;
- an optical source having an optical output, the optical source for generating an optical signal;
- an RF source having an RF output, the RF source for generating an RF signal; and
- an optical modulator coupled to the optical source and the RF source, the optical modulator having a first modulator input, a second modulator input and a modulator output, the first modulator input for receiving an optical signal, the second modulator input for receiving an RF signal, the modulator output for providing an RF modulated optical signal based on the received optical signal and the received RF signal.

2. The RF phased array transmitter system according to claim 1, wherein the phased array further comprises a plurality of inductors, each of the plurality of inductors comprises a first inductor connection and a second inductor connection, the first inductor connection of each one of the plurality of inductors is coupled to its associated one of the plurality of conductive patches, the second inductor connection of each one of the plurality of inductors is connected to either the positive or negative terminal of a voltage source, the polarity being chosen to maintain all photodiodes in reverse bias configuration.

3. The RF phased array transmitter system according to claim 2 further comprising a voltage source, wherein the second inductor connection of each one of the plurality of inductors is coupled to the voltage source.

4. The RF phased array transmitter system according to claim 3, wherein alternating ones of the plurality of inductors is coupled to a positive side of the voltage source, and the number of the plurality of inductors is equal to the number of the plurality of conductive patches.

5. The RF phased array transmitter system according to claim 2 further comprising a plurality of voltage sources, wherein the second inductor connection of each one of the plurality of inductors is coupled to its associated one of the plurality of voltage sources.

6. The RF phased array transmitter system according to claim 1 further comprising an optical divider coupled to the optical modulator, the optical divider having a divider input and divider outputs, the divider input for receiving an RF modulated optical signal, the divider outputs for providing a plurality of RF modulated optical signals to the phased array.

7. The RF phased array transmitter system according to claim 1, wherein each of the plurality of active sources comprises a current generator.

8. The RF phased array transmitter system according to claim 1, wherein each of the plurality of active sources comprises a photodiode.

9. The RF phased array transmitter system according to claim 8, wherein the polarity of the photodiodes alternates from one photodiode to next.

10. The RF phased array transmitter system according to claim 8, wherein the photodiodes are reversed biased.

11. The RF phased array transmitter system according to claim 1, wherein each of the plurality of conductive patches comprises a conductive area, and the conductive area covers an entire surface of its corresponding one of the plurality of conductive patches.

12. The RF phased array transmitter system according to claim 1, wherein a distance between a center of each one of the plurality of conductive patches and a center of an adjacent one of the plurality of conductive patches is less than half of the shortest wavelength of the RF signal generated by the phased array.

13. The RF phased array transmitter system according to claim 1, wherein the phased array is less than an inch in thickness.

14. The RF phased array transmitter system according to claim 1, wherein the phased array is shaped to conform to non-planar surfaces.

15. The RF phased array transmitter system according to claim 1 further comprising a plurality of optical couplings, each of the plurality of optical couplings coupled to its associated one of the plurality of active sources for optically addressing and controlling the associated one of the plurality of active sources.

16. The RF phased array transmitter system according to claim 1, wherein each of the plurality of separation gaps is formed between every two adjacent ones of the plurality of conductive patches, each of the plurality of active sources is coupled to two adjacent ones of the plurality of conductive patches, and the number of the plurality of separation gaps equals the number of the plurality of active sources.

17. The RF phased array transmitter system according to claim 1, wherein each of the plurality of conductive patches is square-shaped or rectangular-shaped.

18. A radio frequency (RF) transmitter system comprising:

a plurality of pattern elements comprising conductive areas, the plurality of pattern elements arranged such that a plurality of separation gaps are formed, wherein each of the plurality of separation gaps is formed between each set of adjacent ones of the plurality of pattern elements; and a plurality of active sources, each of the plurality of active sources formed across its associated one of the plurality of separation gaps, wherein each of the plurality of active sources is operable to receive DC electrical power, each of the plurality of active sources is operable to receive an optical signal, and the plurality of active sources are operable to generate RF current.

19. The RF transmitter system according to claim 18, wherein each one of the plurality of active sources is coupled between its associated ones of the plurality of pattern elements, the electrical power is bias supply power, and the optical signal is an RF modulated optical signal from an optical modulator.

20. The RF transmitter system according to claim 18, wherein the optical signal is optical power, and the plurality of separation gaps are for radiating RF power.

21. A method for transmitting a radio frequency (RF) signal via photonic excitation of a transmitter, the method comprising steps of:

receiving an optical signal;

receiving an RF signal;

modulating the optical signal using the RF signal by an optical modulator;

receiving electrical power by a plurality of active sources of a transmitter;

receiving a modulated optical signal by the plurality of active sources of the transmitter;

generating RF current by the plurality of active sources; and radiating RF power.

22. The method according to claim 21, wherein the plurality of active sources comprises photodiodes.

23. The method according to claim 21, wherein the modulated optical signal comprises a plurality of optical power, and each of the plurality of active sources receives its associated one of the plurality of optical power via an optical fiber.

24. The method according to claim 21, wherein the transmitter further comprises:

a plurality of conductive patches formed in an array such that a plurality of separation gaps are formed, wherein each of the plurality of separation gaps is formed between two adjacent ones of the plurality of conductive patches, and each of the plurality of active sources is formed across its associated one of the plurality of separation gaps.

25. The method according to claim 24, wherein each of the plurality of separation gaps radiates RF power, and wherein the step of radiating RF power comprises generating photovoltages that are in-phase across the plurality of separation gaps.

26. The method according to claim 24, wherein the plurality of separation gaps are excited by coherently phased currents.

* * * * *